UNITED STATES PATENT OFFICE.

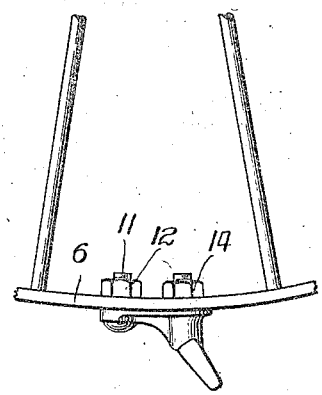
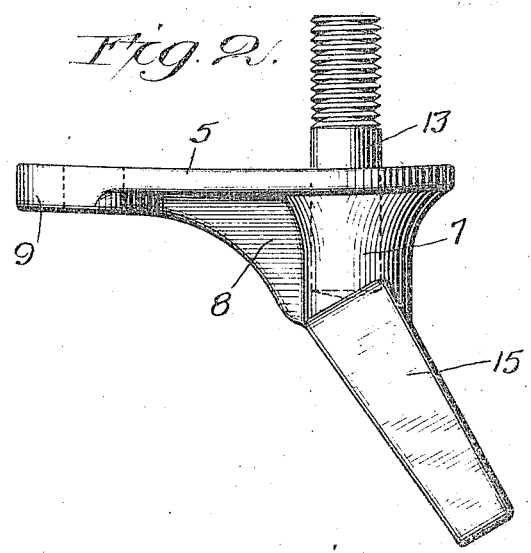
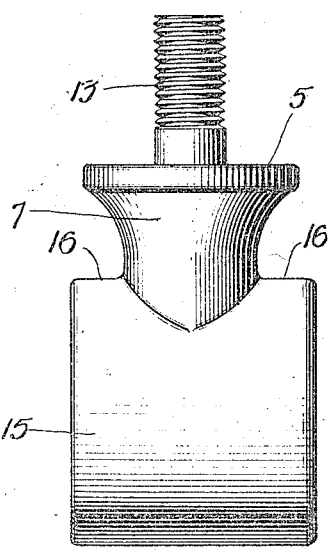
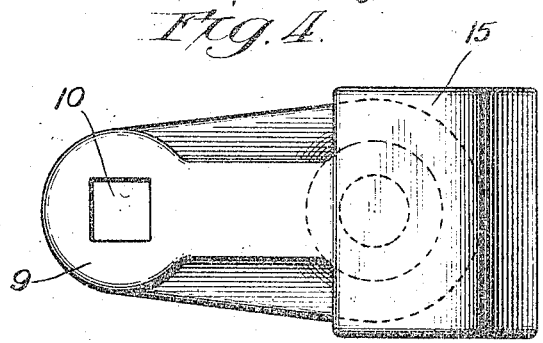

TRUMAN B. FUNK, OF MOLINE, ILLINOIS, ASSIGNOR TO MOLINE PLOW COMPANY, OF MOLINE, ILLINOIS, A CORPORATION OF ILLINOIS.

WHEEL-SPUD.

1,196,536.     Specification of Letters Patent.     Patented Aug. 29, 1916.

Application filed March 20, 1916. Serial No. 85,468.

*To all whom it may concern:*

Be it known that I, TRUMAN B. FUNK, a citizen of the United States, residing at Moline, in the county of Rock Island and State of Illinois, have invented certain new and useful Improvements in Wheel-Spuds, of which the following is a specification.

This invention relates to a spud intended primarily for use on the wheels of tractors designed to operate in soft ground for the purpose of drawing plows or similar agricultural implements or appliances.

The object of the present invention is to so form and construct the spuds that they will afford the necessary amount of resistance in the soft ground to prevent slippage of the ground wheels.

Experience has shown that, in order to secure satisfactory results in the operation of tractors designed to draw heavy loads, it is necessary that the tractor wheel surface be sufficiently exposed to direct contact with the soft or loose ground to pack down the underlying soil around the embedded spuds, so that the latter will press against a sufficiently dense and compacted soil to secure the necessary gripping action.

The spud of the present invention is so designed as to provide a neck portion of reduced width as compared with the blade portion, to the end that the soil may be tightly compacted around the latter by the direct pressure of the wheel rim which increases the holding properties of the blade, and at the same time reduces the area adjacent to the rim surface, with the result that the packing and lodgment of soil around the rim will be reduced and greater opportunity be afforded for the cleaning and the scraping off of the soil. The spud, furthermore, is designed to effect an easy entrance into the ground, and is so shaped as to be strong and durable.

In the drawings: Figure 1 is a section of a tractor wheel with one of the spuds of the present invention secured to the rim; Fig. 2 is a side elevation of the spud; Fig. 3 is a rear elevation of the same; and Fig. 4 is an inverted plan view of the same.

The spud consists of an elongated base section 5 which is slightly curved to conform to the curvature of the flat wheel rim 6, and is tapered from rear to front, as shown in Fig. 4. The base section, at its rear end, has depending therefrom a neck 7 of generally cylindrical formation which is flared at its upper end at the point where it merges into the base section. The neck is reinforced and is supported on its rearward side by a web 8 which merges into a thickened boss 9 provided with a bolt-hole 10 shaped to receive a bolt 11 which passes through the wheel rim and is held in place by a nut 12. This neck also affords a socket for a rear bolt 13 which receives a nut 14, on its inward side of the rim. The neck has depending therefrom a blade 15 of generally rectangular formation which extends diagonally downward to the rear and which, at the point of juncture with the neck, affords a pair of shoulders 16, the blade being of considerably greater width than the transverse thickness of the neck.

Spuds of the character above described are arranged at suitable intervals around the periphery of the wheel, and the formation and arrangement of the blades are such that, as the wheel rotates, the blades will pierce into the ground in a substantially vertical line of movement and the earth will be pressed down and compacted around and above the blades by pressure of the wheel rim, so that a firm grip will be secured on the ground. By making the blades of greater width than the neck, the full compressive effect of the wheel rim will be secured with an attendant increase in the tractive effort of the wheel, and at the same time, when the spuds are lifted from the ground by the advance of the wheel, the shoulders 16 of the blades will serve to break up the compacted earth and prevent its compacting around the neck and in the angles between the spud and the rim to a much greater degree than would be the case if the spuds were uniformly tapered from the wheel rim to the outer edge. In this way, the spud will keep itself comparatively clean, and its efficiency will be maintained.

With many of the present forms of spuds, there is a tendency for the earth to pack up around the spud, owing to the fact that the deeper into the ground the spud goes, the greater the wedge effect and therefore the earth is lodged between the spuds and it finally builds up to the point where it practically eliminates the good that spuds are supposed to do. On the spud herein disclosel the neck is not only smaller in diameter, but presents a curved surface toward the line of pull, causing the earth to slide past the neck and keeping the spud clean. Suitable fillets are provided in the design to eliminate all corners, where dirt might collect.

The action therefore, may be stated as follows: If a greater load is applied than the tractive ability can handle, the wheel will slip. The slipping of the wheel causes the earth to pass neck 7 at a fairly high rate of speed, cleaning it of any dirt that may be lodged there. At the same time, blade 15, being projected backward from the line of travel, endeavors to dig farther into the ground and sets up the same action as is used by the family cat when climbing trees, etc.

The most important feature of this spud is its self-cleaning feature, and the angle at which blade 15 is set.

I claim:

1. A wheel spud consisting of a base portion adapted to lie flat against a wheel rim, a neck depending from the base portion, and a blade secured to the neck and of greater depth than the neck, and forming abrupt shoulders in conjunction therewith at the point of attachment, substantially as described.

2. A wheel spud consisting of a base portion adapted to lie flat against a wheel rim, a neck depending from the base portion, and a blade carried by the neck and of greater width than the neck and extending downwardly in diagonal relation thereto, and forming abrupt shoulders at the point of juncture with the neck, substantially as described.

TRUMAN B. FUNK.

Witnesses:
L. C. BLANDING,
W. I. RICHARDS.